(No Model.)
C. W. FOX & W. A. WENMOTH.
VEHICLE BRAKE.
No. 309,217. Patented Dec. 16, 1884.
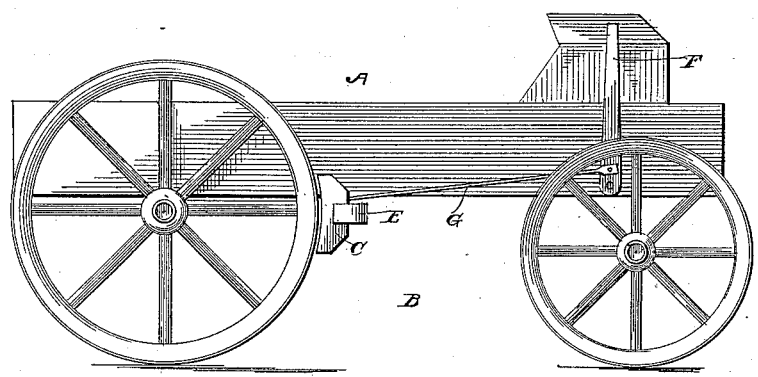
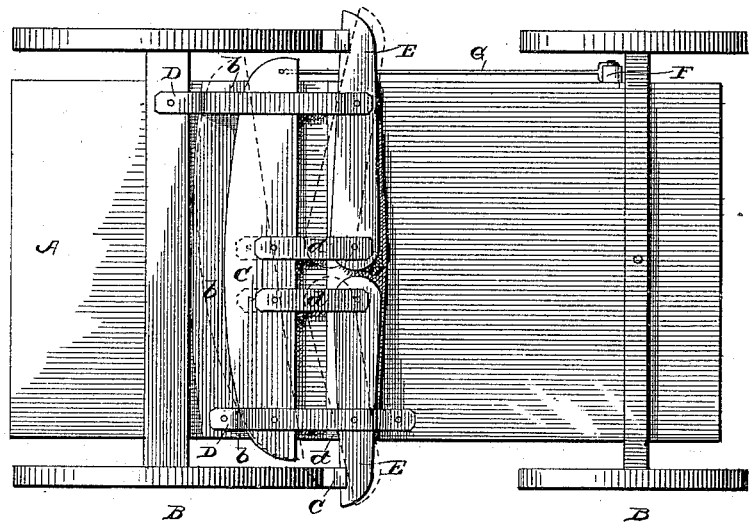
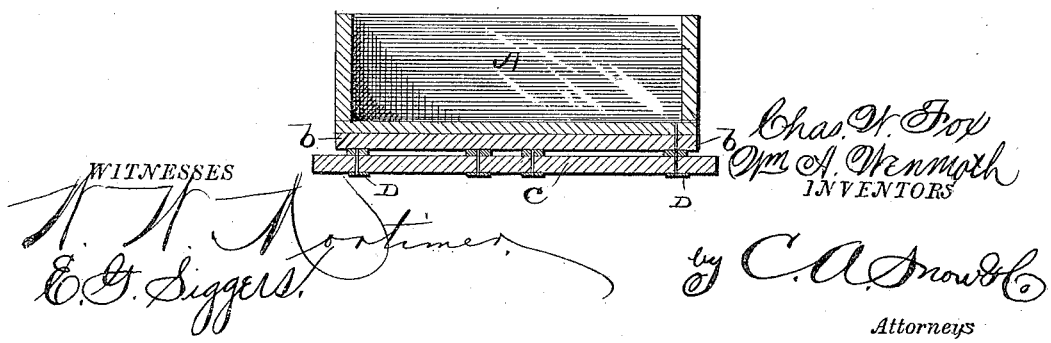

UNITED STATES PATENT OFFICE.

CHARLES W. FOX AND WILLIAM A. WENMOTH, OF MORRIS, NEW YORK.

VEHICLE-BRAKE.

SPECIFICATION forming part of Letters Patent No. 309,217, dated December 16, 1884.

Application filed September 18, 1884. (No model.)

*To all whom it may concern:*

Be it known that we, CHARLES W. FOX and WILLIAM A. WENMOTH, citizens of the United States, residing at Morris, in the county of Otsego and State of New York, have invented a new and useful Improvement in Vehicle-Brakes, of which the following is a specification, reference being had to the accompanying drawings.

Our invention relates to wagon-brakes; and it has for its object to provide a device of this character which shall be cheap and simple in its construction, effective in its operation, and one that will be strong and durable.

With these ends in view the invention consists in the combination, with a wagon, of brake-levers pivoted to the under side of the wagon-body, a second lever for operating said brake-levers, and means, located within easy reach of the driver, for operating the same.

The invention consists in the improved construction and combinations of parts hereinafter fully described, and pointed out in the claims.

In the drawings, Figure 1 is a side elevation of a wagon equipped with our improved brake. Fig. 2 is a bottom view of the same, and Fig. 3 is a section taken through the lever for operating the brake-levers.

In the accompanying drawings, in which like letters of reference indicate corresponding parts in all the figures, A represents the wagon-body, and B the running-gear.

Upon the under side of the wagon-body A, a short distance in front of the rear carrying-wheels, is secured a strip, *a*, which extends the entire width of the bottom.

Just in rear of the strip *a*, upon the under side of the wagon-body, is secured a similar strip, *b*. Upon this strip *b* is pivoted at one of its ends an arm or lever, C, within a bracket, D. A similar bracket is also provided at the other side of the wagon-body, in which works the free end of the lever C.

Upon the forward strip, *a*, are pivoted, near their outer ends, two brake-levers, E, said brake-levers being pivoted within the brackets D by means of bolts or pins passing through said brackets and the strip *a*.

Upon the inner sides of the outer ends of the two brake-levers are secured brake-shoes *c*, which, when the inner ends of the brake-levers are pushed forwardly, bear against the wheels of the wagon. The inner ends of the brake-levers are connected with the arm or lever C by means of links *e*, located upon the upper and under side of said brake-levers and the lever C.

Upon the side of the wagon, near the forward end thereof, and within easy reach of the driver, is pivoted a foot-lever, F, which is connected with the operating arm or lever C by rod G.

The operation is as follows: The lever F is pushed forward, which, by its connection with the pivoted lever C, draws the same in a corresponding direction. The forward movement of the end of the pivoted lever C pushes the inner ends of the brake-levers forward, and as said levers are pivoted their outer ends carry the brake-shoes into engagement with the wheels, and thus serve to "brake" the same. Upon the lever F being pushed rearwardly the lever C is moved rearwardly, which movement releases the brake-shoes from engagement with the wheels.

It will be seen from the above description that a wagon-brake constructed as above described is simple, cheap, and durable, and that its operation is certain and effective.

Having fully described our invention, what we claim as new, and desire to secure by Letters Patent, is—

1. In a vehicle-brake, the combination, with a vehicle-body, of levers E E, pivoted to the under side thereof, a lever, C, pivoted at one end in rear of said levers, plates connecting the lever C with the inner end of the levers E, a lever pivoted to the side of the wagon, and a rod connecting said lever with the free end of the lever C, substantially as set forth.

2. In a vehicle-brake, the combination, with a vehicle-body, of levers E, pivoted near their outer ends in brackets D, secured to the under side thereof, a lever, C, pivoted in rear of said levers E at one end, its other end sliding in one of the brackets D, plates *d*, connecting the inner ends of the levers E with the lever C, a rod secured to the free end of the lever C, and a lever, F, pivoted to the side of the vehicle, and connected with the lever C by said rod G, and brake-shoes c, secured upon the inner sides of the levers E near their outer ends, substantially as set forth.

In testimony that we claim the foregoing as our own we have hereto affixed our signatures in presence of two witnesses.

CHARLES W. FOX.
WILLIAM A. WENMOTH.

Witnesses:
SILAS S. MATTESON,
E. A. STRONG.